Patented Dec. 22, 1936

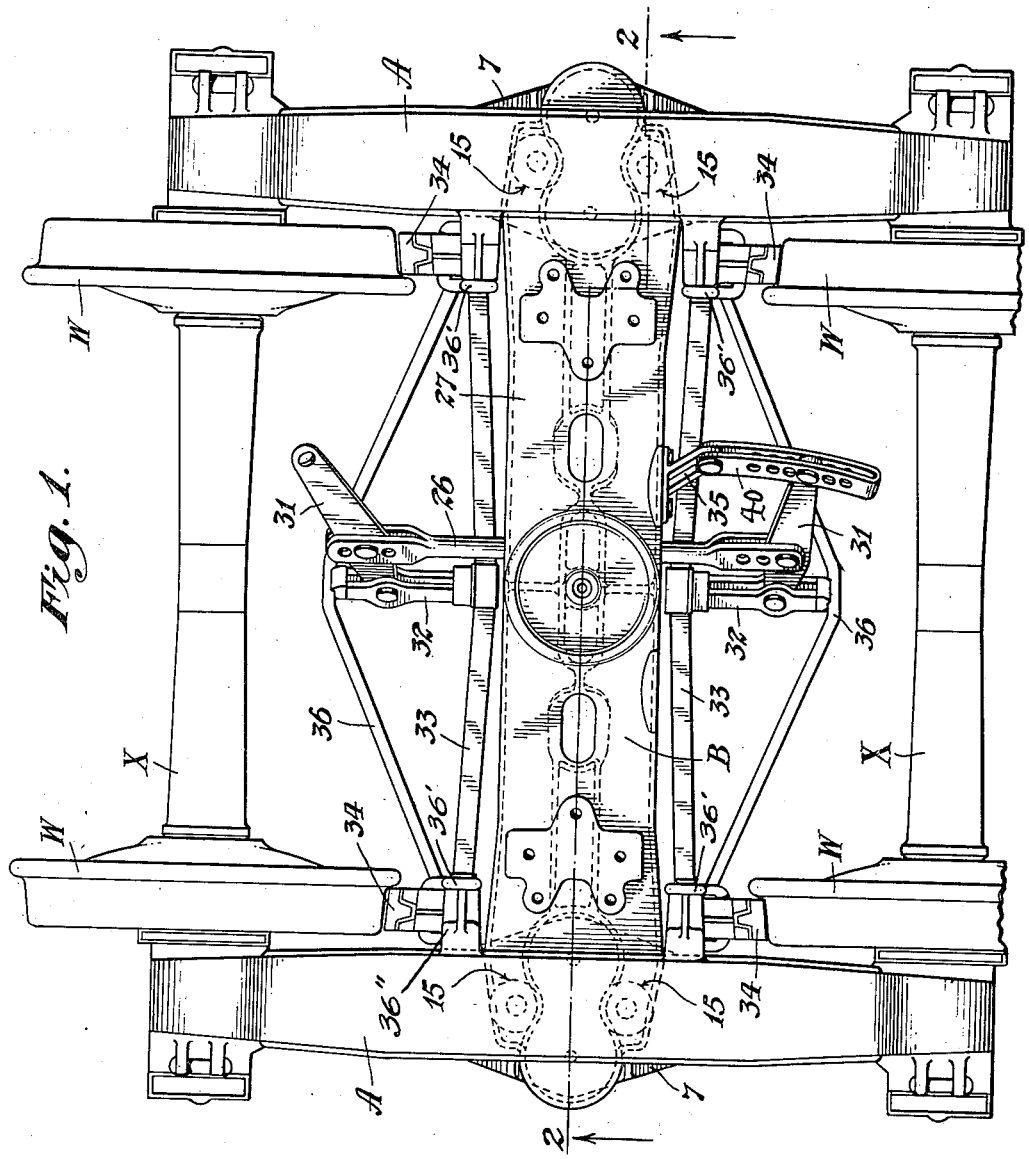

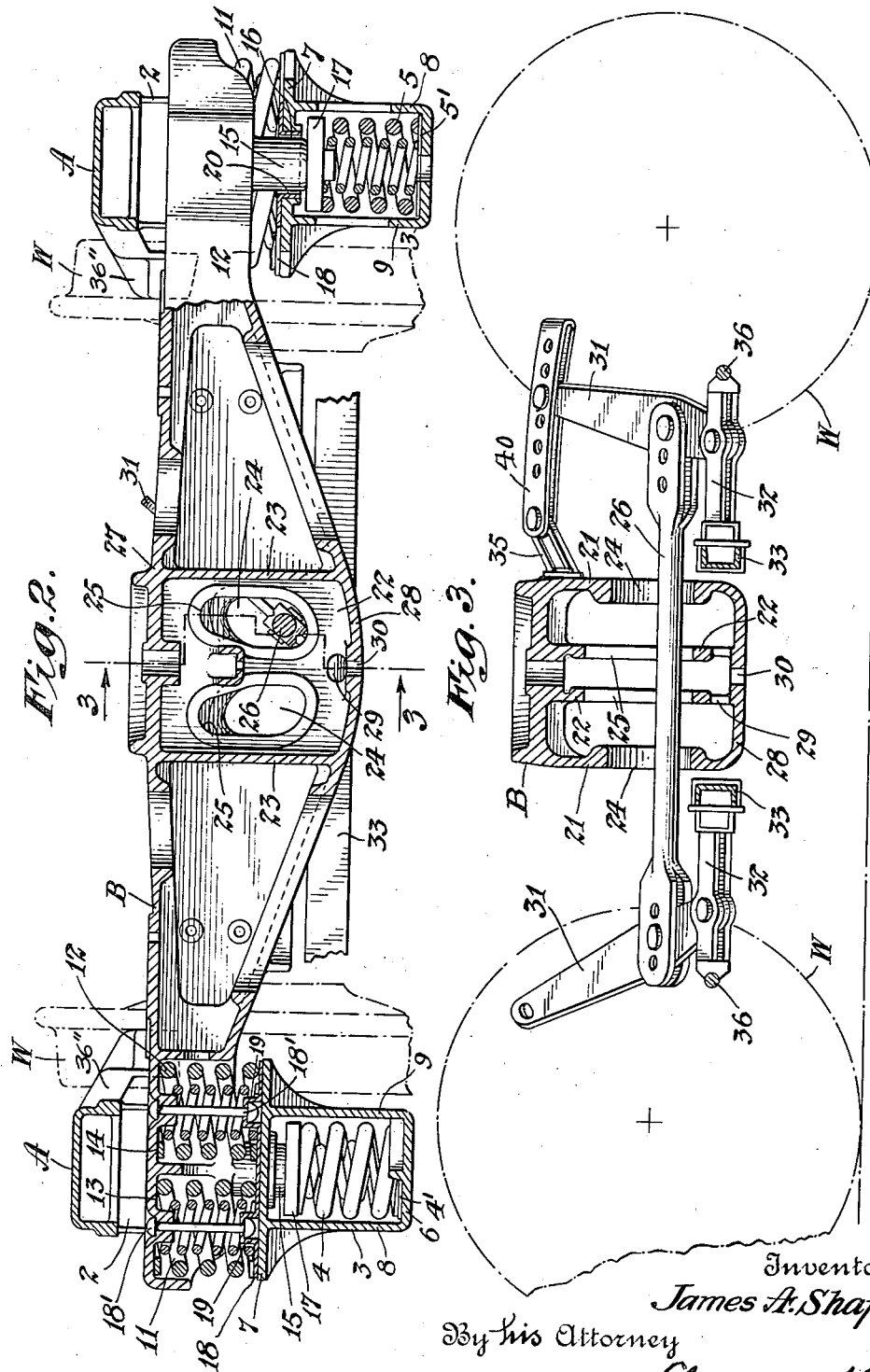

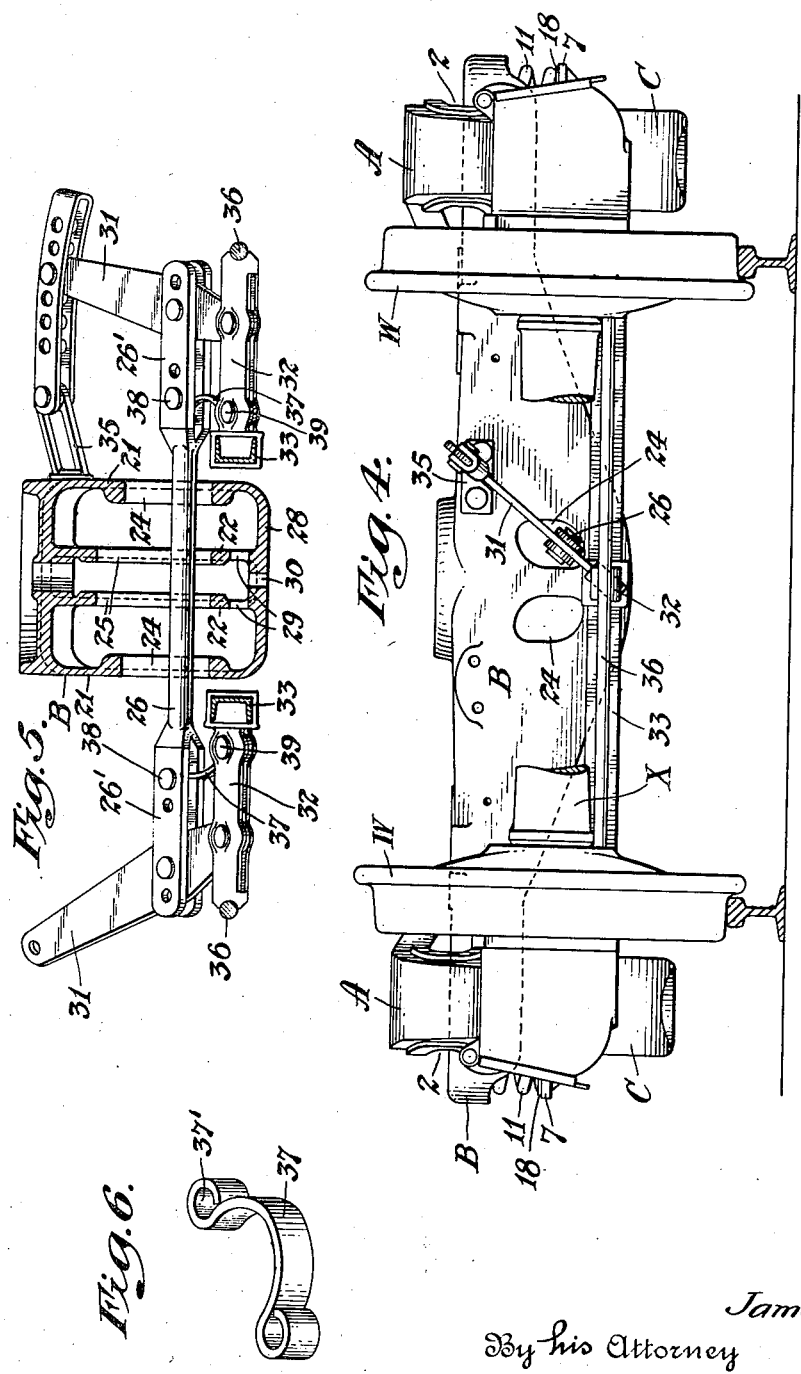

2,065,200

UNITED STATES PATENT OFFICE 2,065,200

CAR TRUCK WITH BRAKE MECHANISM

James A. Shafer, East Cleveland, Ohio, assignor to National Malleable and Steel Castings Company, Cleveland, Ohio, a corporation of Ohio Application September 22, 1931, Serial No. 564,300

4 Claims. (Cl. 188—52)

This invention relates to car trucks and is particularly concerned with the provision of an improved truck construction capable of accommodating in a superior manner brake operating mechanism without, at the same time, involving structural weaknesses. Another feature of the invention resides in novel and effective mechanism for leveling brake beams, which mechanism, while especially advantageous in combination with constructions of the character hereinafter described, is also useful in connection with other types of brake operating devices. The invention not only achieves these advantages but also provides a truck which is simple from a structural standpoint, relatively inexpensive to manufacture, easy to assemble, and durable in operation.

With these objects in view, in order clearly to illustrate my invention I shall describe a preferred embodiment thereof in detail with reference to the accompanying drawings. Other objects and advantages will appear as the description of the various features proceeds. In the drawings, Fig. 1 is a plan view of a car truck in which the invention is embodied; Fig. 2 is a vertical section on the line 2—2 of Fig. 1; Fig. 3 is a vertical section taken on the line 3—3 of Fig. 2; Fig. 4 is an end elevation of the truck shown in Fig. 1; Fig. 5 is a view similar to Fig. 3, but showing a novel construction of the brake operating mechanism, and Fig. 6 is a detail of one member thereof.

There is shown a truck including side frames A, axles X carried therewith, wheels W, and bolster B. Each of the side frames A is provided with a window 2 for the reception of the bolster and is shown as of the type specifically described in my copending application, Serial No. 459,480, filed June 6, 1930. Below the window each side frame is formed with a portion designated generally by the numeral 3, in which springs 4, 5 are adapted to be seated and housed; said portion comprising a bottom shelf 6, a top flange or shelf 7, and side walls 8, 9. Said side walls are integral with said shelves 6 and 7 and are also integral with the side walls of the tension members C of the side frame.

For supporting the bolster, each side frame is provided with springs 4, 5 in the tension portion 3, together with springs 11, 12 on the shelf 7. The springs 11, 12 on each side are received within pockets 13, 14, respectively in the adjacent end portion of the bolster. Said springs 11, 12 are shown arranged in overlapping relation to the associated lower springs 4, 5. It may be noted that the springs 4, 5 are arranged longitudinally of the side frame while the springs 11, 12 are arranged longitudinally of the bolster or transversely of the side frame; the shelf 7 extending transversely beyond the lower shelf 6 for this purpose. The bolster rests upon the springs 4, 5 through the medium of projections 15, integral with said bolster and extending through holes 16 in the shelf 7, said projections resting upon caps 17 on the tops of said springs. As shown, each spring 4, 5, 11 and 12 may comprise both inner and outer coils, and the spring caps 17 serve to distribute the pressure from the bolster lugs 15 over both inner and outer coils of the respective springs 4, 5. Spring plates 4', 5' may be interposed between the bottoms of the springs 4, 5 and the shelf 6 as shown.

The springs 11 and 12 may bear upon the shelf 7 through a spring retaining plate 18. Projections 19 of said plate extend into the lower portions of said springs as shown and serve to center the latter. Flanges 20 extend downwardly from said plate into the holes 16 and take up the wear resulting from movement of the lugs 15 with respect to the side frame. Pins or bolts 18' may be employed for retaining the plate 18 and springs 11, 12 and for holding said elements in position on the bolster when the side frame is removed. The plate 18 may be conveniently pressed out of sheet steel and may be readily replaced when the flanges 20 have become worn out.

It is to be noted that the bolster in this construction ties together the two side-frame members, and that it is extended downwardly, or substantially deepened in the vertical plane, adjacent its mid-portion, there being no spring plank to interfere with it, and is shown as desirably extending below the level of the lugs on the bolster which tie the side frames, and well below the axles and brake beams, with the further advantage of lowering the center of gravity of the truck. The bolster is preferably formed with side walls 21, and adjacent its midportion is shown as provided with webs 22 which extend longitudinally thereof to join transverse webs 23 between the side walls. The side walls 21 and webs 22 are formed with openings 24 and 25, respectively, where the bolster is of maximum depth, for receiving the brake rod 26 which extends longitudinally of the truck. These openings must be of sufficient size to permit the necessary movement of the brake rod, and accordingly where provided in known arrangements impair the strength of the bolster. In the present construction, provision is made for avoiding the disadvantages of carrying the brake rod underneath the bolster, and at the same time, the bolster is actually strengthened, though openings for the brake rod are formed in it. It is preferable to employ corresponding brake rod openings at either side of the mid-section of the bolster so that whichever way it is applied to the truck, the brake mechanism can be rigged without alteration. Moreover, the bolster has top wall 27 and bottom wall 28 for connecting the side walls, so that the center portion of the bolster, where the bending stresses are greatest is thus box-shaped, and further strengthened. In this construction it is desirable to have openings 29 and 30 in the webs and bottom wall, respectively, to permit water to drain.

The brake mechanism in Fig. 3 is shown as consisting of the usual brake levers 31 connected to brake rod 26, and also to fulcrum members 32, which in turn are connected to the brake beams 33. It may be noted that the brake rod is here above the brake beams. The brake beams 33 are connected to the brake shoes 34 in any suitable manner, not shown. One of the brake levers is connected at its upper end to the usual arm 40, which is shown secured to the bolster by means of the bracket 35. The usual truss rods 36 are provided. Conventional brake hangers 36' (Fig. 1) are mounted on the customary hanger supports 36'' (Figs. 1 and 2) for supporting the brake beams from the side frames in the usual manner.

In Figs. 5 and 6 there is shown a particularly simple and effective construction for leveling the brake beams. Here, the forked ends 26' of the brake rods are shown as extended to points adjacent the brake beams, while links 37 (which may be of somewhat resilient material) are pivotally secured in the forks by bolts 38 which pass through openings 37' formed in the ends of the links. The other ends of the links may be similarly secured to fulcrum members 32 by bolts 39. It may be noted that in this construction the links are between the brake levers and respective brake beams and preferably adjacent the latter. Thus, there is no necessity for forming cumbersome or heavy extensions on the brake rigging, and the whole construction is very compact. Moreover, the attachment of the links at points adjacent the brake beams results in most effective leveling with a minimum of strain on the parts.

It will be seen that through my invention the brake rod is effectively prevented from falling upon the rails in the event of failure of any of the supporting parts of the brake rigging. At the same time the provision of means additional to the truck parts for receiving the rod is obviated. In addition, the advantages of passing the brake rod through the bolster are attained without any sacrifice of bolster strength.

It will be appreciated that while I prefer to use the bolster supporting spring construction shown, other suitable spring constructions may be substituted. The particular bolster supporting spring arrangement herein disclosed, as well as certain other features shown but not claimed herein, are claimed in my copending application No. 459,480 hereinbefore referred to.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a car truck, a pair of side frames including wheel axles journaled in said frames, each side frame having a spring seating portion, a bolster forming the sole means for tying said side frames together, a brake mechanism including brake beams positioned on either side of said bolster and below the centers of said axles, said bolster having its center portion deepened to a point below said spring seating portions and substantially in the horizontal plane of said brake beams, said brake mechanism including connecting means for said brake beams comprising a rod extending through an opening in the center portion of said bolster.

2. In a car truck, a pair of side frames, each side frame having a central bolster opening and a spring seating portion below said opening, a bolster entering said openings and engaging portions of said side frames adjacent said central openings to form the sole means for tying the side frames together, said bolster comprising top, bottom and side walls forming substantially a box-section, a brake mechanism including brake beams positioned on either side of said bolster, said side walls and bottom wall of said bolster being deepened at its center portion to a point below said brake beams and said spring seating portions, said bolster side walls having openings therein and said brake mechanism including connecting means for said brake beams comprising a rod extending through said openings.

3. In a car truck, a pair of side frames including wheel axles journaled in said frames, each side frame having a spring seating portion, a bolster forming the sole means for tying said side frames together, a brake mechanism including brake beams positioned on either side of said bolster and below the centers of said axles, said bolster having its center portion deepened to a point substantially in the horizontal plane of said brake beams, said brake mechanism including connecting means for said brake beams comprising a rod extending through an opening in the center portion of said bolster.

4. In a car truck, a pair of side frames, each side frame having a central bolster opening and a spring seating portion below said opening, a bolster entering said openings and engaging portions of said side frames adjacent said central openings to form the sole means for tying the side frames together, said bolster comprising top, bottom and side walls forming substantially a box-section, a brake mechanism including brake beams positioned on either side of said bolster, said side walls and bottom wall of said bolster being deepened at its center portion to a point below said brake beams, said bolster side walls having openings therein and said brake mechanism including connecting means for said brake beams comprising a rod extending through said openings.

JAMES A. SHAFER.